(12) United States Patent
Ham

(10) Patent No.: US 8,064,020 B2
(45) Date of Patent: Nov. 22, 2011

(54) LIQUID CRYSTAL DISPLAY DEVICE AND METHOD OF FABRICATING THE SAME

(75) Inventor: Yong Sung Ham, Anyang-si (KR)

(73) Assignee: LG Display Co., Ltd., Seoul (KR)

( * ) Notice: Subject to any disclaimer, the term of this patent is extended or adjusted under 35 U.S.C. 154(b) by 288 days.

(21) Appl. No.: 10/843,551

(22) Filed: May 10, 2004

(65) Prior Publication Data

US 2004/0227882 A1    Nov. 18, 2004

(30) Foreign Application Priority Data

May 14, 2003    (KR) .................. 10-2003-0030642

(51) Int. Cl.
*G02F 1/1337* (2006.01)
(52) U.S. Cl. .................. 349/124; 349/123; 349/125
(58) Field of Classification Search ........... 349/123–132
See application file for complete search history.

(56) References Cited

U.S. PATENT DOCUMENTS

| | | | | |
|---|---|---|---|---|
| 5,030,322 A * | 7/1991 | Shimada et al. | ............... | 216/23 |
| 5,723,069 A * | 3/1998 | Mineta et al. | ............ | 252/299.67 |
| 5,770,826 A | 6/1998 | Chaudhari et al. | ........ | 204/157.15 |
| 6,020,946 A | 2/2000 | Callegari et al. | .............. | 349/124 |
| 6,061,114 A | 5/2000 | Callegari et al. | .............. | 349/125 |
| 6,061,115 A | 5/2000 | Samant et al. | ................. | 349/129 |
| 6,124,914 A | 9/2000 | Chaudhari et al. | ............ | 349/129 |
| 6,195,146 B1 | 2/2001 | Chaudhari et al. | ............ | 349/124 |
| 6,300,926 B1 * | 10/2001 | Yoneya et al. | .................. | 345/87 |
| 6,313,896 B1 | 11/2001 | Samant et al. | ................. | 349/124 |
| 6,331,381 B1 | 12/2001 | Chaudhari et al. | ............ | 430/320 |
| 6,346,975 B2 | 2/2002 | Chaudhari et al. | ............ | 349/124 |
| 6,999,149 B2 * | 2/2006 | Miyajima et al. | ............. | 349/138 |
| 7,088,413 B2 * | 8/2006 | Martinot-Lagarde et al. | ............................ | 349/129 |
| 2005/0052596 A1 * | 3/2005 | Jung et al. | ..................... | 349/113 |

FOREIGN PATENT DOCUMENTS

| | | |
|---|---|---|
| JP | 9-230351 | 9/1997 |
| JP | 2001-021891 | 1/2001 |
| KR | 2002-56618 | 7/2002 |
| WO | WO 03/019278 * | 3/2003 |

* cited by examiner

*Primary Examiner* — Dung T. Nguyen
(74) *Attorney, Agent, or Firm* — Brinks Hofer Gilson & Lione

(57) ABSTRACT

A liquid crystal display device has first and second substrates. A first electrode on the first substrate is alignment-treated and a second electrode on the second substrate is alignment-treated. A liquid crystal layer is disposed between the first substrate and the second substrate. Alignment-treating includes forming an alignment direction. The alignment direction of the first and second substrates is formed by irradiating an ion beam onto the first and second electrodes using an ion beam irradiation apparatus.

7 Claims, 6 Drawing Sheets

LIQUID CRYSTAL DISPLAY DEVICE AND METHOD OF FABRICATING THE SAME

This application claims the benefit of the Korean Application No. P2003-0030642 filed on May 14, 2003, which is hereby incorporated by reference.

BACKGROUND OF THE INVENTION

1. Field of the Invention

The present invention relates to a liquid crystal display (LCD), and more particularly, to a liquid crystal display having an electrode used as an alignment layer, and a method of fabricating the same.

2. Description of the Related Art

In general, a cathode ray tube (CRT) has been most widely used among display devices for displaying image information on a screen until now, but has many inconveniences owing to a large volume and weight compared with the display area.

With the development of electronic industries, the display device whose usage was limited to a TV Braun tube and so forth, is has been expanded for use in a personal computer, a notebook, a wireless terminal, a vehicle instrument panel, an electronic display board and the like. Also, due to the development of information communication technology, since it is possible to transmit a large amount of image information, the importance on a next generation display device capable of processing and displaying the large amount of image information has constantly been increasing.

Many requirements exist for such a next generation display device; the next generation display device must be lighter, thinner, shorter and smaller, have a high luminance, a large-sized screen, low power consumption and a low price. Among such next generation display devices, the LCD has recently gained in popularity.

The LCD has excellent resolution, better than other flat displays, and a fast response speed compared to that of the CRT in implementing a moving picture.

Twisted nematic (TN) mode LCDs have become extremely popular and widely used among LCDs at the present time.

In the TN mode LCD, after alignment layers are respectively formed on two substrates, directors of liquid crystal molecules adjacent to the lower substrate are perpendicular to directors of liquid crystal molecules adjacent to the upper substrate.

When an electric field is not applied, liquid crystal molecules of the TN mode LCD have a structure in which longer axes of the liquid crystal molecules are twisted in a spiral fashion. The liquid crystal molecules have a pitch and are parallel to the substrate.

Recently, LCDs employing a new mode are being actively researched. As examples of the new mode, there are in-plane switching (IPS) mode, optically compensated birefringence mode, etc.

The IPS mode LCD generates a horizontal electric field so as to drive the liquid crystal molecules in a horizontal state with respect to the substrates by forming two electrodes on an identical substrate and applying a voltage between the two electrodes. In other words, the longer axis of the liquid crystal molecule does not stand up with respect to the substrates.

A related art in-plane switching (IPS) mode LCD will now be described in detail with reference to the accompanying drawings.

FIG. 1 is a sectional view of a related art LCD.

Referring to FIG. 1, a gate electrode 121 of conductive material such as metal is formed on a first transparent substrate 111. A gate insulator 130 such as silicon nitride (SiNx) or silicon oxide (SiOx) is formed on the gate electrode 121 and the first transparent substrate 111.

An active layer 141 of amorphous silicon is formed on the gate insulator 130 disposed on the gate electrode 121. Ohmic contact layers 151 and 152 of impurity-doped amorphous silicon are formed on the active layer 141.

Source and drain electrodes 161 and 162 of conductive material such as metal are formed on the ohmic contact layers 151 and 152. The source and drain electrodes 161 and 162 form a thin film transistor (TFT) together with the gate electrode 121.

A passivation layer 170 of silicon nitride (SiNx), silicon oxide (SiOx) or organic insulator is formed on a resultant structure including the source and drain electrodes 161 and 162. The passivation layer 170 has a contact hole 171 exposing the drain electrode 162.

A pixel electrode 181 of transparent conductive material is formed on a pixel region of the passivation layer 170 and is electrically connected to the drain electrode 162 through the contact hole 171.

A first alignment layer 191 of polyimide whose surface is aligned in a predetermined direction is formed on the pixel electrode 181.

At this time, the gate electrode 121 is connected with a gate line, and the source electrode 161 is connected with a data line. The pair of gate lines and the pair of data lines perpendicularly crossing the gate lines define a unit pixel region.

Meanwhile, an upper substrate including a second transparent substrate 110 is arranged over and spaced apart by a predetermined distance from the lower substrate constructed as above and including the first transparent substrate 111.

A black matrix layer 120 for preventing light leakage in portions other than the pixel regions is formed at a portion corresponding to the TFT beneath the second substrate 110.

A color filter layer 131 is formed beneath the black matrix layer 120 and the second substrate 110. The color filter layer 131 includes red (R), green (G) and blue (B) color filters repeatedly arranged, each color filter corresponding to one pixel region.

A common electrode 140 of transparent conductive material is formed beneath the color filter layer 131. A second alignment layer 150 of polyimide whose surface is aligned in a predetermined direction is formed beneath the common electrode 140.

A liquid crystal layer 190 is interposed between the first alignment layer 191 and the second alignment layer 150. Liquid crystal molecules of the liquid crystal layer 190 have an initial alignment direction, which is decided by the alignment direction of the first and second alignment layers 191 and 150.

The alignment layer forming process for determining the initial alignment direction of the liquid crystal molecules will be described in more detail hereinafter.

First, the alignment layer forming process includes the steps of coating a polymer film used as a raw material of the alignment layer and aligning the coated polymer film in a predetermined direction.

The alignment layer mainly uses a polyimide-based organic material, and is aligned by a rubbing method.

The rubbing method includes the steps of: coating a polyimide-based organic material film on a substrate; vaporizing a solvent contained in the coated polyimide-based organic material film at a temperature of 60-80° C.; hardening the polyimide-based organic material film at a temperature of 80-200° C. to form a polyimide alignment layer; and rubbing the polyimide alignment layer using a rubbing cloth such as a velvet in a predetermined direction to form an alignment direction.

Referring to FIG. 2, a method of fabricating the LCD of FIG. 1 will now be described in detail.

First, upper and lower substrates having the construction described in FIG. 1 are fabricated (S100).

Next, a cleaning step (S110) is performed to remove foreign substances on the upper and lower substrates each having various patterns formed thereon. After that, an alignment layer-printing step (S120) for printing polyimide (PI), which is a raw material of the alignment layer, on the upper and lower substrates is performed using an alignment layer-printing apparatus.

Afterwards, an alignment layer-plasticizing step (S130) in which a high temperature heat is applied to the printed polyimide to vaporize a solvent and harden the polyimide is performed.

Next, an alignment layer-rubbing step (S140) in which an upper surface of the plasticized alignment layer is rubbed in a predetermined direction by using a rubbing apparatus to form a groove is performed.

After the alignment layer-forming step is completed, a seal pattern serving as an adhesive is formed at an edge of the upper substrate except for a liquid crystal injection inlet, and a spacer is dispensed on the lower substrate (S150).

Next, the prepared two substrates are attached to each other with a spacing therebetween. In the attaching of the two substrates, a preciseness of a few micrometers is required to prevent light from being leaked when the preciseness is out of the given value (S160).

After that, a cell-cutting step (S170) for cutting the opposing substrates attached into a plurality of unit cells is performed. The cell-cutting step (S170) is performed to cut the completely attached substrates to a necessary size, and includes a scribing step for forming a cutting line on the outer surfaces of the upper and lower substrates, and a breaking step for dividing the attached substrates into the unit cells by applying an impact on the scribed line.

Finally, a liquid crystal is injected into a space between the two substrates cut in a unit cell, and a liquid crystal injection inlet is sealed to prevent the injected liquid crystal from being leaked, thereby completing an LCD (S180).

In the above LCD, the liquid crystal has a physical characteristic, which is varied with the alignment state of the liquid crystal molecules. The physical characteristic of the liquid crystal causes a difference in the response by an external force such as an electric field.

Owing to the aforementioned property of the liquid crystal molecules, it is an essential technique to control the alignment of the liquid crystal molecules for research on the physical property of the liquid crystal molecules and constitution of the LCD.

Especially, the rubbing process for allowing the liquid crystal molecules to be aligned uniformly is an important factor to determine the normal operation of the LCD and the uniform display characteristic of the screen, and the rubbing process accordingly has been the subject of much research.

The above-described rubbing method has advantages in that since the orientation treatment is easy, it is suitable for mass production and stable orientation can be made.

However, the usage of a roller having a defective rubbing cloth in the above rubbing process causes a rubbing failure.

In other words, since the rubbing method using such a rubbing cloth is performed by direct contact between the alignment layer and the rubbing cloth, various problems may occur. These problems may include contamination of liquid crystal cell due to the occurrence of particles, fracture of the thin film transistor (TFT) device, the need for an additional cleaning process after the rubbing process, non-uniformity of the alignment direction in a large-sized application, etc. All of these problems serve to lower the production yield of the LCD.

Also, since the above rubbing method includes coating the organic material film and rubbing the coated organic material film, an additional process is required, and cost of the alignment layer is required, thereby increasing the fabrication costs.

SUMMARY OF THE INVENTION

Accordingly, the present invention is directed to a liquid crystal display and a method of fabricating the same that substantially obviate one or more problems due to limitations and disadvantages of the related art.

The present invention provides a liquid crystal display and a method of fabricating the same that can simplify the fabrication method and solve problems due to the rubbing failures by omitting the printing the alignment layer and rubbing the printed alignment layer by directly irradiating an ion beam onto electrodes formed on the uppermost layers of the upper and lower substrates to perform the alignment.

Additional features of aspects of the invention will be set forth in part in the description which follows and in part will become apparent to those having ordinary skill in the art upon examination of the following or may be learned from practice of the invention. The advantages of aspects of the invention may be realized and attained by the structure particularly pointed out in the written description and claims hereof as well as the appended drawings.

A liquid crystal display device is provided that comprises: a first substrate and a second substrate; a first alignment-treated electrode on the first substrate; a second alignment-treated electrode on the second substrate; and a liquid crystal layer between the first substrate and the second substrate.

According to another aspect of the present invention, there is provided a method of fabricating a liquid crystal display device, the method comprising: forming a thin film transistor and a first electrode on a first substrate; forming a black matrix layer, a color filter layer and a second electrode on a second substrate; and producing an alignment direction on the first and second substrates by irradiating an ion beam onto the first electrode and the second electrode.

According to another aspect of the present invention, there is provided a liquid crystal display device comprising: a first substrate and a second substrate; a first electrode and a second electrode on the first alignment-treated substrate; an overcoat layer the second alignment-treated substrate; and a liquid crystal layer between the first substrate and the second substrate.

According to another aspect of the present invention, there is provided a method of fabricating a liquid crystal display device, the method comprising: forming a first electrode and a second electrode on a first substrate; forming a color filter layer and a black matrix layer on a second substrate; producing an alignment direction on the first substrate by irradiating an ion beam onto the first substrate; and forming a liquid crystal layer between the first substrate and the second substrate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this application, illustrate embodiment(s) of the invention and together with the description serve to explain the principle of the invention. In the drawings.

DETAILED DESCRIPTION OF THE INVENTION

The present invention will now be described more fully with reference to the accompanying drawings, in which exemplary embodiments of the invention are shown.

Figure 1:
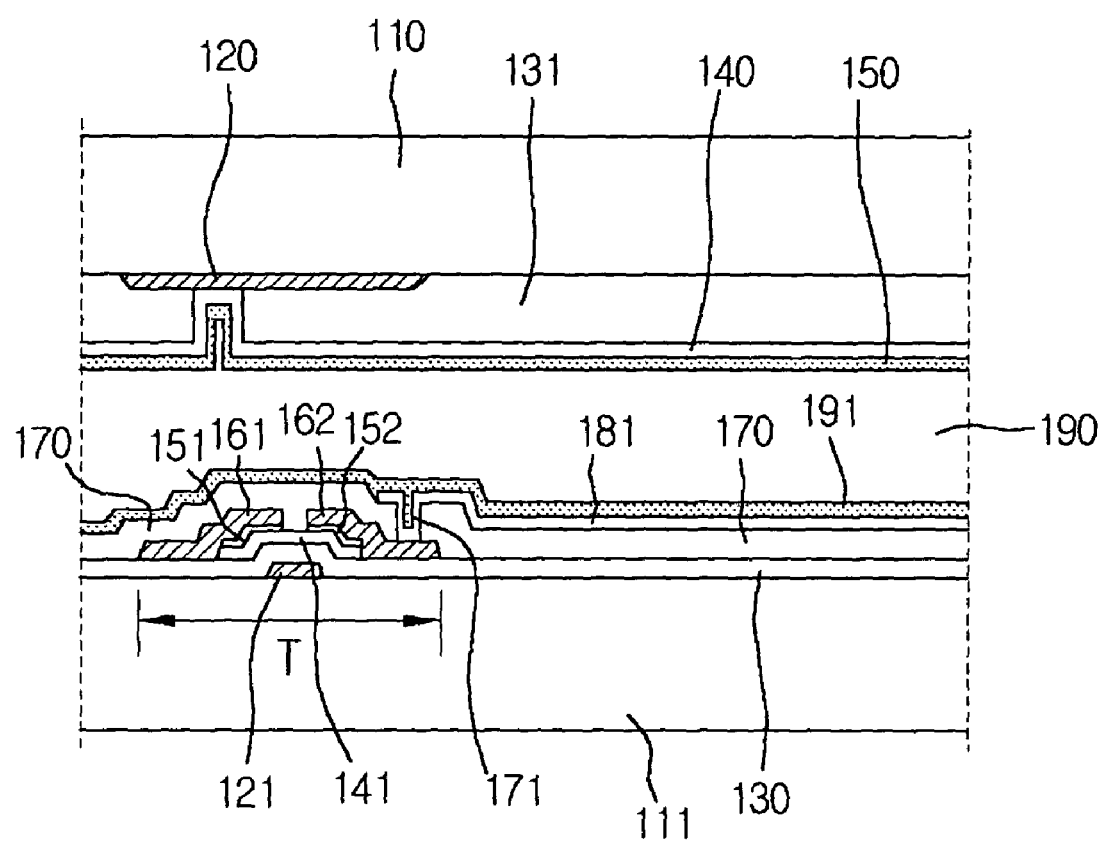
FIG. 1 is a sectional view of an LCD according to the related art.
Figure 2:
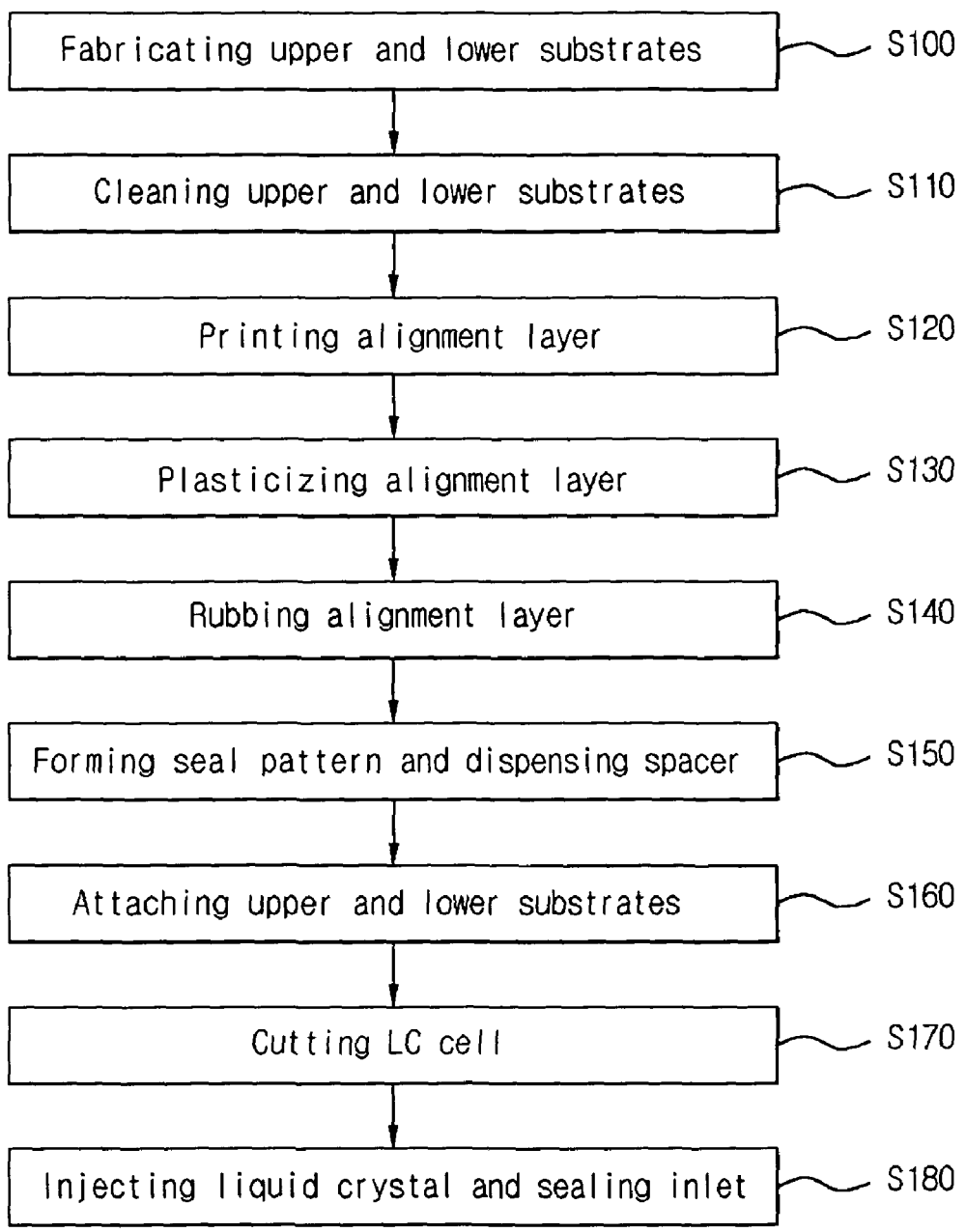
FIG. 2 is a process flow diagram illustrating a method of fabricating an LCD according to the related art.
Figure 3:
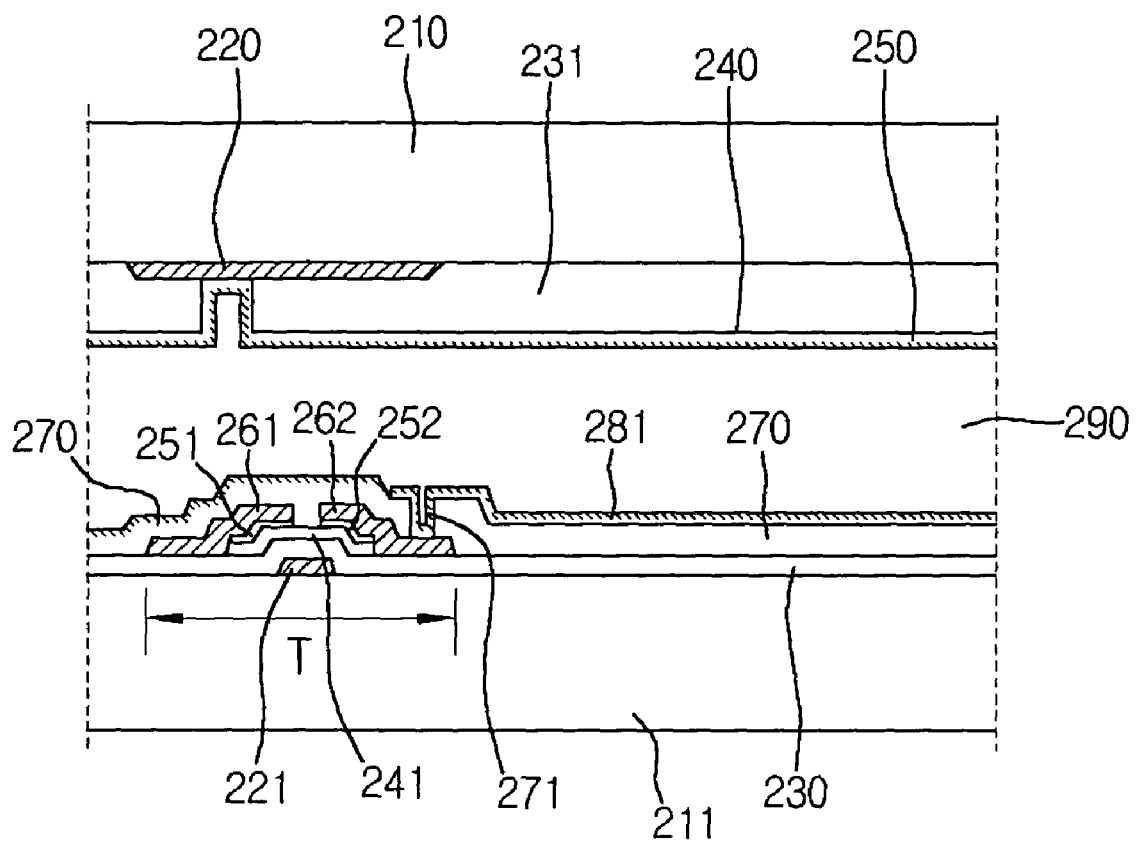
FIG. 3 is a sectional view of a TN mode LCD according to the present invention.

FIG. 3 is a sectional view of a TN mode LCD according the present invention.

Referring to FIG. 3, a gate electrode 221 of conductive material such as metal is formed on a first transparent substrate 211. A gate insulator 230 such as silicon nitride (SiNx) or silicon oxide (SiOx) is formed on the gate electrode 221 and the first transparent substrate 211.

An active layer 241 of amorphous silicon is formed on the gate insulator 230 disposed on the gate electrode 221. Ohmic contact layers 251 and 252 of impurity-doped amorphous silicon are formed on the active layer 241.

Source and drain electrodes 261 and 262 of conductive material such as metal are formed on the ohmic contact layers 251 and 252. The source and drain electrodes 261 and 262 form a thin film transistor (TFT) together with the gate electrode 221.

A passivation layer 270 of silicon nitride (SiNx), silicon oxide (SiOx) or organic material is formed on a resultant structure including the source and drain electrodes 261 and 262. The passivation layer 270 has a contact hole 271 exposing the drain electrode 262.

A pixel electrode 281 of transparent conductive material such as indium tin oxide (ITO) or indium zinc oxide (IZO) is formed on a pixel region of the passivation layer 270 and is electrically connected to the drain electrode 262 through the contact hole 271.

The pixel electrode 281 is also used as an alignment layer for aligning liquid crystal molecules by irradiating an ion beam onto the pixel electrode 281. The pixel electrode 281 is formed on the passivation layer 270 and exposes parts of the passivation layer 270. Herein, the pads of the passivation layer 270 is used as an alignment layer for align liquid crystal molecules by irradiating an ion beam onto the part of the passivation layer 270 thereby forming an alignment surface.

At this time, the gate electrode 221 is connected with a gate line, and the source electrode 261 is connected with a data line. The pair of gate lines and the pair of data lines perpendicularly crossing the gate lines define a unit pixel region.

Meanwhile, an upper substrate including a second transparent substrate 210 is arranged over and spaced apart by a predetermined distance from the lower substrate constructed as above and including the first transparent substrate 211.

A black matrix layer 220 for preventing light leakage in portions other than the pixel regions is formed at a portion corresponding to the TFT beneath the second substrate 210.

A color filter layer 231 is formed beneath the black matrix layer 220 and the second substrate 210. The color filter layer 231 includes red (R), green (G) and blue (B) color filters repeatedly arranged, each color filter corresponding to one pixel region.

The color filters may be formed by a dyeing method, a printing method, a pigment dispersion method, an electroplating method or the like.

A common electrode 240 of transparent conductive material such as ITO or IZO is formed beneath the color filter layer 231.

The common electrode 240 is also used as an alignment layer for aligning liquid crystal molecules by irradiating an ion beam onto the common electrode 240 thereby forming an alignment surface 250.

Figure 4:
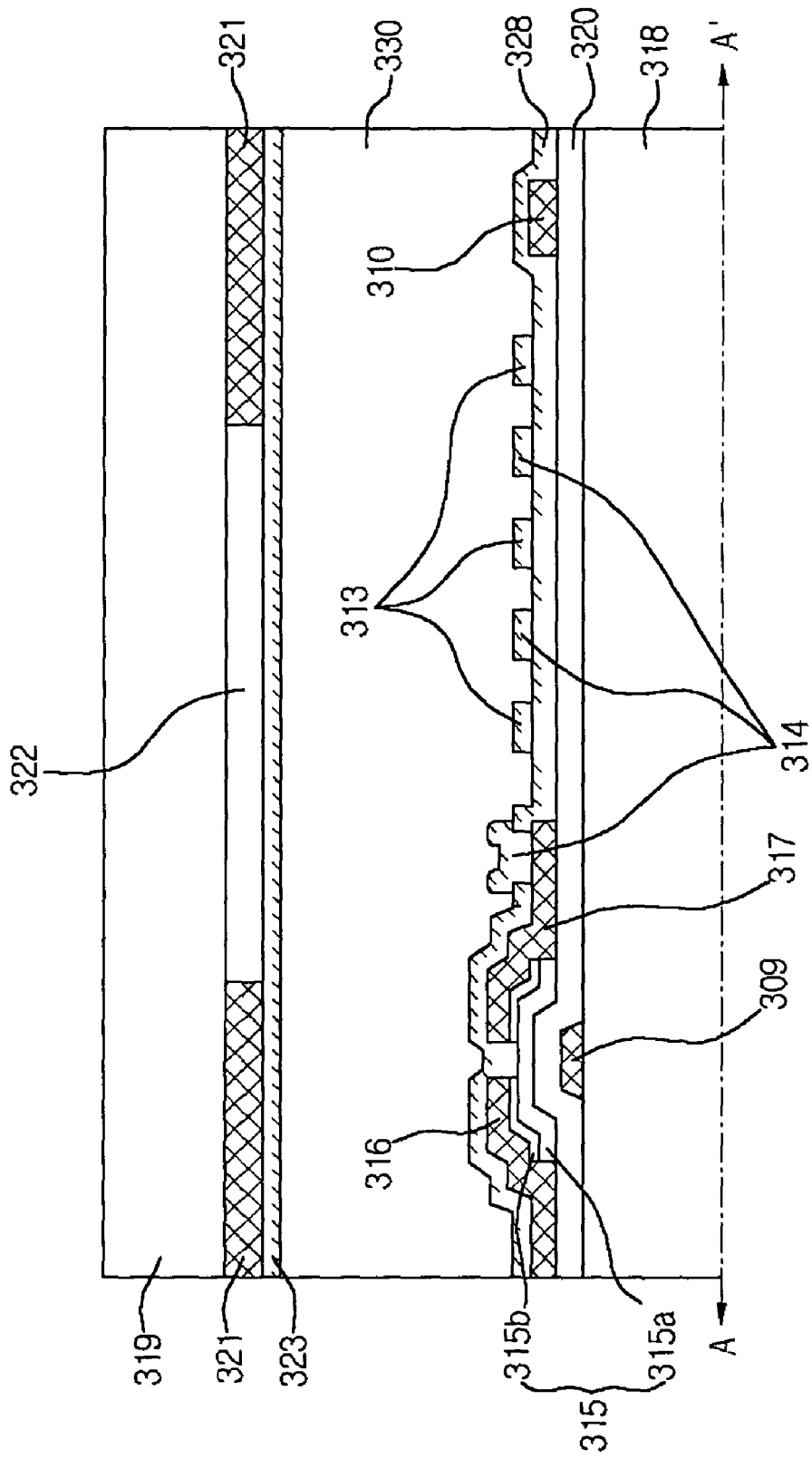
FIG. 4 is a sectional view of an IPS mode LCD according to the present invention.

FIG. 4 is a sectional view of an IPS mode LCD according to the present invention.

Referring to FIG. 4, an IPS mode LCD according to the present invention includes a data line 310 and a gate line (not shown) arranged on a first substrate, for defining a pixel region, a common line arranged in parallel with the gate line within the pixel region, a thin film transistor arranged at a cross point of the gate line and the data line 310, and a pixel electrode 314 and a common electrode 313 arranged in parallel with the data line 310 within the pixel region.

In more detail, an IPS mode LCD according to the present invention is fabricated by attaching the first substrate 318 and a second substrate 319 opposing the first substrate 318, and injecting a liquid crystal material 330 into a space between the first and second substrates 318 and 319. First, a metal film is deposited on the first substrate 318 and is then patterned to form a plurality of gate lines and gate electrodes 309 branched from the respective gate lines at a position of the thin film transistor.

Next, a gate insulating layer 320 is formed on an entire surface of the first substrate 318 including the gate electrode 309. On a predetermined area of the gate insulating layer 320, a semiconductor layer 315 consisting of an active layer 315a and an ohmic contact layer 315b is formed.

On the gate insulating layer 320, a plurality of data lines 310 forming a matrix configuration together with the gate lines are formed.

Source electrode 316 and drain electrode 317 of a thin film transistor are formed concurrently with the date lines 310 when the data lines 310 are formed.

Then, a passivation layer 328 is formed on an entire surface of a resultant structure of the first substrate 318.

Thereafter, a pixel electrode 314 electrically connected to the drain electrode 317, and common line and common electrode 313 are formed to be parallel with the data line 310.

At this time, the common electrode 313 and the pixel electrode 314 may be formed on the same plane as the gate electrode 309 or the source/drain electrode 316/317, or may be formed on a different plane with interposing an insulting layer therebetween.

Also, the common electrode 313 and the pixel electrode 314 may be formed of (i) a transparent conductive film passing through light, such as indium tin oxide (ITO) or indium zinc oxide (IZO), or (ii) an identical metal to the material of the gate electrode or the source/drain electrode. Further, the common electrode 313 and the pixel electrode 314 can be formed in a single layer structure or a dual layer structure.

The first substrate 318 including the common electrode 313 and the pixel electrode 314 is subject to an ion beam irradiation by an ion beam irradiating apparatus such that liquid crystal molecules are aligned in a predetermined direction. The pixel electrode 314 and the common electrode 313 are formed on the passivation layer 328 and expose parts of the passivation layer 328. Herein, parts of the passivation layer 328 is used as an alignment layer for align liquid crystal molecules by irradiating an ion beam onto the part of the passivation layer 328 thereby forming an alignment.

The common electrode 313 and the pixel electrode 314 may be formed in a stripe shape or a zigzag shape. When the common electrode 313 and the pixel electrode 314 are formed in the zigzag fashion, the number of bent points is not limited and is at least one.

The data line may be also formed in a zigzag shape.

On the other hand, on the second substrate 319, a black matrix layer 321 for preventing light from being leaked is formed, and a color filter layer 322 having color filter patterns of red (R), green (G) and blue (B) is formed between the black matrix layers 321.

The black matrix layer 321 is formed on an upper surface of the outermost common electrode among the common electrodes formed within the unit pixel to block incident light.

On the color filter layer 322, an organic overcoat layer 323 for planarizing an upper surface thereof and protecting the underlying color filter layer 322 is formed.

The overcoat layer 323 has an upper portion, which is aligned by irradiating ion beam thereon.

The overcoat layer 323 may be formed from organic materials such as a photo-acryl or a BCB (benzo cyclobutene), or inorganic materials such as a silicon oxide (SiOx) or a silicon nitride (SiNx).

Figure 5:
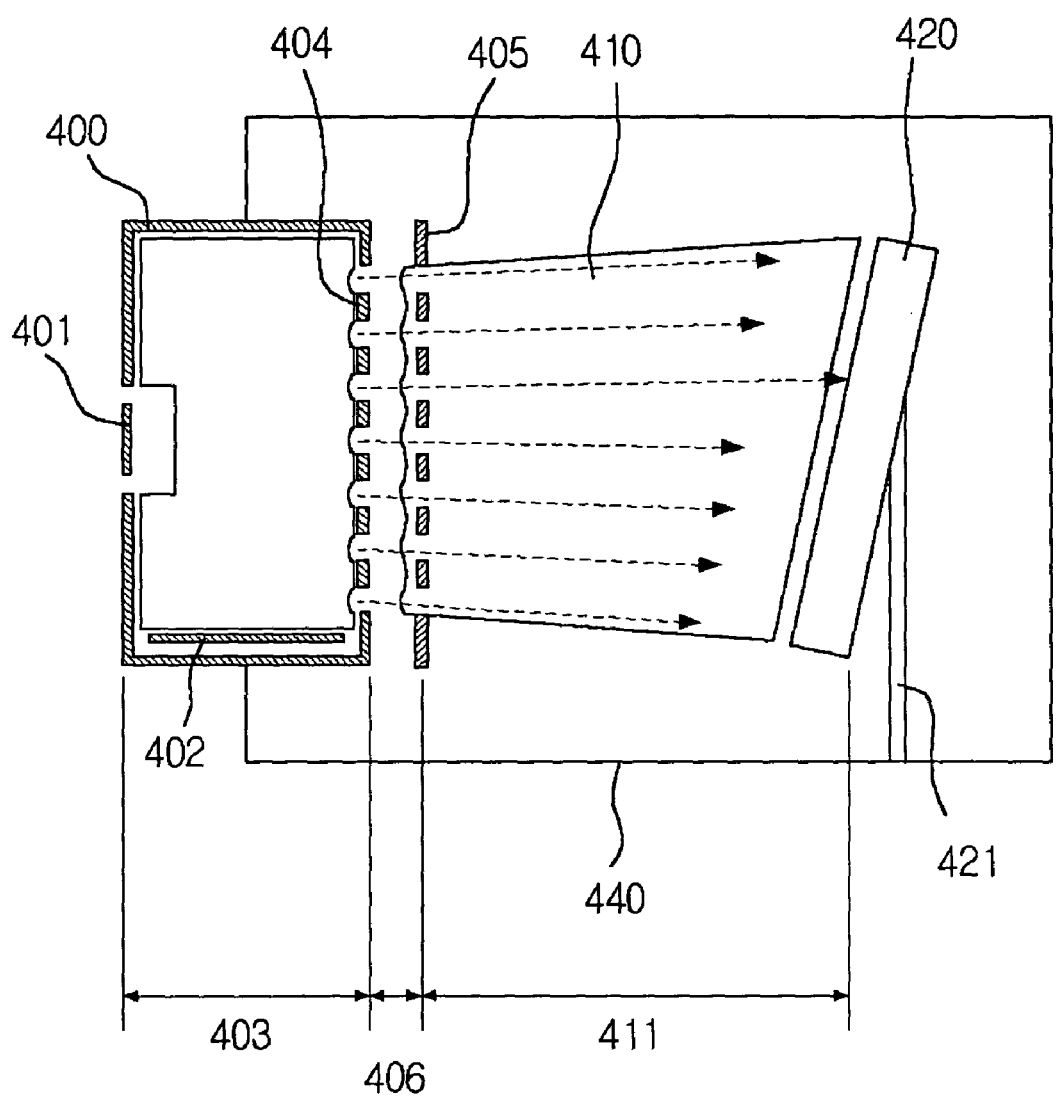
FIG. 5 is a schematic view of an ion beam irradiating apparatus according to the present invention.

As aforementioned, the alignment treatment in the upper and lower substrates is performed using an ion beam irradiating apparatus. FIG. 5 is a schematic view of an ion beam irradiating apparatus according to the present invention. The alignment treatment using the ion beam irradiating apparatus shown in FIG. 5 will now be described.

First, a first substrate including a pixel electrode and a second substrate opposing the first substrate and including a black matrix layer and a color filter layer are prepared. After the prepared first and second substrates are loaded on the ion beam irradiating apparatus, an ion beam is irradiated onto the first and second substrates.

At this time, the first (lower) substrate of a TN mode LCD includes a pixel electrode formed thereon, the second (upper) substrate of the TN mode LCD includes a common electrode formed thereon. Also, the first (lower) substrate of an IPS mode LCD includes a pixel electrode and a common electrode formed thereon, and the second (upper) substrate of the IPS mode LCD includes a black matrix layer and a color filter layer formed thereon.

Hereinafter, an embodiment of the ion beam irradiating apparatus will be described in detail, but the present invention is not limited thereto.

Again referring to FIG. 5, the ion beam irradiating apparatus is designed to irradiate an ion beam onto a substrate 420 fixed to a holder 421 inside a vacuum container 440. The substrate 420 may be the first substrate and/or the second substrate described above.

The ion beam irradiation apparatus includes an ion beam source 400, the vacuum container 440 in which an ion beam 410 generated from the ion beam source 400 is directly irradiated onto the substrate 420, and the holder 421 for fixing the substrate 420 such that the substrate 420 is kept with a predetermined angle inside the vacuum container 440. The ion beam irradiation apparatus includes three regions of a discharge plasma region 403, an extraction region 406 and a beam plasma region 411. Ions are generated in the discharge plasma region 403, accelerated through the extraction region 406, and travel through the beam plasma region 411.

Ions are generated in the discharge plasma region 403 by electron bombardment of neutral gas atoms. Electrons are emitted by a hot filament, cathode 401, and accelerated by a potential difference between the cathode 401 and anode 402. Before the discharge starts, the source body is at the anode 402 potential. After the discharge starts, however, the connecting resistor, not shown, allows the source body and the ion beam extracting medium 404 to float to the cathode potential, directing the discharge current to the anode. The discharge plasma region 403 establishes itself between the cathode 401, anode 402, chamber walls and the ion beam extracting medium 404.

To extract the ion beam from the discharge plasma region 403, we raise the anode voltage to a positive voltage above ground. Raising the anode potential increases the plasma potential to nearly the same value. Thus any ion leaving the discharge plasma and striking the substrate 420 surface arrives with an energy determined by the anode potential. The ion beam acceleration medium 405 is held at a negative potential and the ions pass through the apertures in the accelerator grid without striking it and form a collimated ion beam 410, eventually striking the substrate 420 which is held at ground potential. Although not shown in the drawings, a shutter may be installed between the ion beam source 400 and the substrate 420 so as to adjust the irradiation time of the ion beam 410 onto the substrate 420.

The ion beam source 400 generates ions and the ion beam 410. In other words, injected gas due to a voltage difference between the cathode 401 and the anode 402 is ionized to generate plasma including electrons and ions. The generated ions are extracted in the form of ion beams by an extracting electrode while passing through the ion beam extracting medium 404.

The ion beam 410 extracted from the discharged plasma is accelerated by an electric field applied to the ion beam acceleration medium 405 and is irradiated onto the substrate 420 with a predetermined angle.

The ion beam has an energy of 200-4,000 eV.

The substrate 420 is inclined at a predetermined angle with respect to the ion beam 410. By using the ion beam, a desired alignment direction and a desired pretilt angle of liquid crystal molecules may be obtained. The ion beam 410 is irradiated at an angle of 0-90°.

At this time, any alignment layer is not formed on the substrate 420. In other words, the alignment is performed by irradiating the ion beam onto the pixel electrode or the common electrode formed of ITO or IZO.

Figure 6:
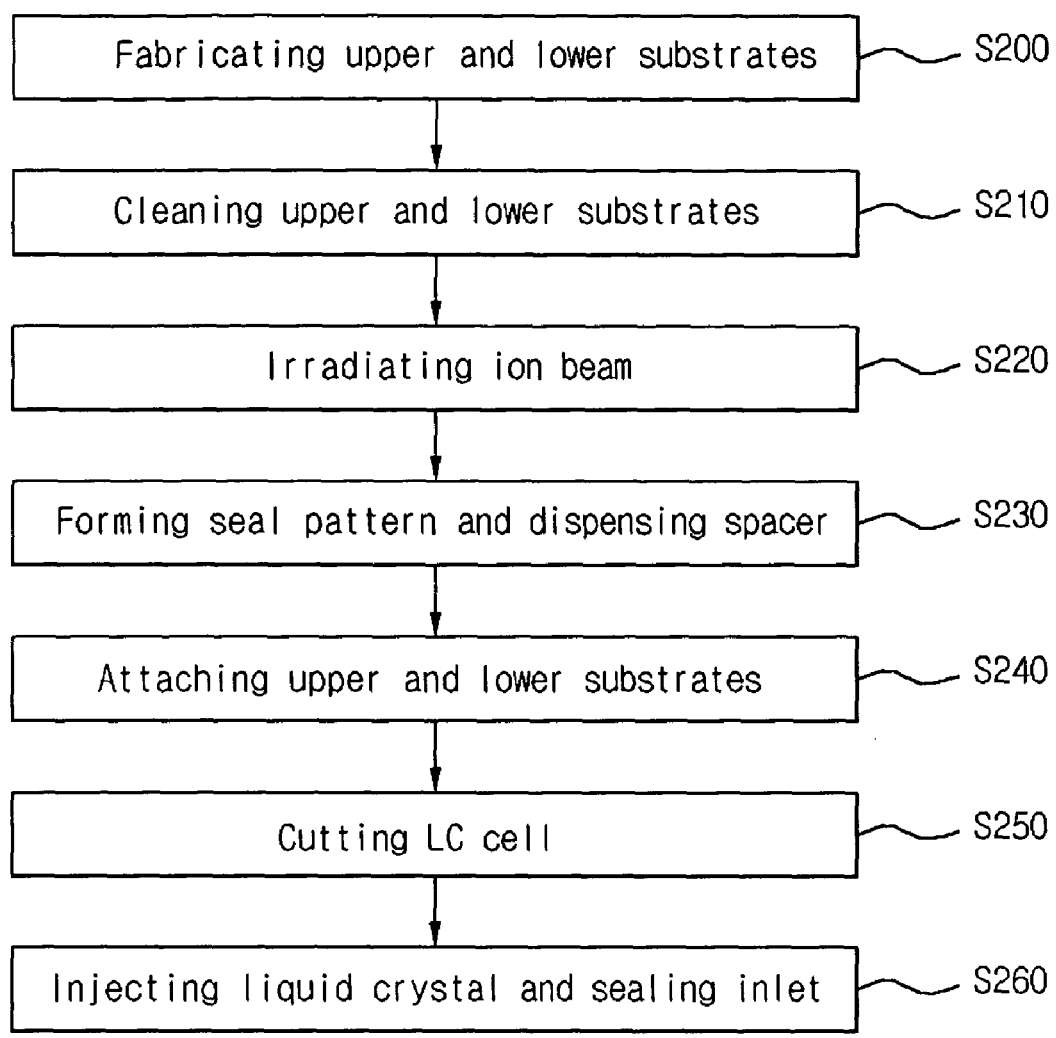
FIG. 6 is a flow diagram illustrating a method of fabricating a TN mode LCD and an IPS mode LCD according to the present invention.

FIG. 6 is a flow diagram illustrating a method of fabricating a TN mode LCD and an IPS mode LCD according to the present invention.

In the IPS mode LCD according to the present invention, the first substrate (or lower substrate) including the pixel electrode and the common electrode is provided thereon with the passivation film, and the second substrate (or upper substrate) opposing the first substrate and including the black matrix layer and the color filter layer is provided thereon with the overcoat layer.

In the TN mode LCD according to the present invention, the first substrate (or lower substrate) includes the pixel electrode and the common electrode formed thereon, and the second substrate (or upper substrate) opposing the first substrate includes the black matrix layer, the color filter layer and the common electrode of transparent conductive film.

First, upper and lower substrates of the TN mode LCD and the IPS mode LCD constructed as above are fabricated (S200).

Next, a cleaning step (S210) is performed to remove foreign substances on the upper and lower substrates on which various patterns are formed.

Next, the cleaned substrates are loaded on the ion beam irradiation apparatus and then an ion beam irradiation step (S220) of performing an alignment treatment of the pixel electrode and the common electrode formed on the upper and lower substrates is performed.

After the ion beam irradiation step (S220) is completed, a seal pattern serving as an adhesive is formed at an edge of the upper substrate except for a liquid crystal injection inlet, and a spacer is dispensed on the upper substrate or the lower substrate (S230).

Next, the prepared two substrates are attached to oppose each other (S240). In the attaching of the two substrates, a preciseness of a few micrometers is required to prevent light from being leaked when the preciseness is out of the given value.

After that, a cell-cutting step (S250) for cutting the opposing substrates attached into a plurality of unit cells is performed. The cell-cutting step (S250) is performed to cut the completely attached substrates at a necessary size, and includes a scribing step for forming a cutting line on the outer surfaces of the upper and lower substrates, and a breaking step for dividing the attached substrates into the unit cells by applying an impact on the scribed line.

Finally, a liquid crystal is injected into a space between the two substrates cut in a unit cell, and a liquid crystal injection inlet is sealed to prevent the injected liquid crystal from being leaked, thereby completing an LCD (S260).

In addition to the aforementioned injection method, a drop-filling method where a liquid crystal is dropped on at least one substrate of the upper and lower substrates and then the two substrates are attached may be used. At this time, the seal pattern may be formed in a closed structure because it does not need a liquid crystal injection inlet.

The process for forming the liquid crystal layer using the drop-filling method provides an effect in the enhancement of the production by reducing the forming time of the liquid crystal layer as the panel is large-sized.

Accordingly, the drop-filling method permits the sealing of the liquid crystal inlet to be omitted.

As described above, an alignment of liquid crystal molecules may be performed by irradiating an ion beam onto a transparent electrode formed on the uppermost plane of an LCD without a separate process of forming an alignment layer, thereby simplifying the fabrication method of the LCD, increasing the production yield, and saving the fabrication costs.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A liquid crystal display device comprising:
   a first substrate and a second substrate;
   a pixel electrode and a passivation layer on the first substrate, the pixel electrode formed on the passivation layer and exposing parts of the passivation layer, the pixel electrode and the parts of the passivation layer being alignment-treated;
   a common electrode on the second substrate, the common electrode being alignment-treated; and
   a liquid crystal layer between the first substrate and the second substrate,
   wherein the common electrode have a surface, which is alignment-treated by irradiating an ion beam using an ion beam irradiation apparatus,
   wherein the pixel electrode and the parts of the passivation layer have a surface, which are alignment-treated by irradiating the ion beam using the ion beam irradiation apparatus,
   wherein the liquid crystal layer directly contacts the pixel and the common electrodes on the first and second substrates,
   wherein the ion beam has an energy of 200-4,000 eV and is irradiated at an angle of 0-90°.

2. The liquid crystal display device according to claim 1, further comprising:
   a plurality of gate lines arranged in a first direction on the first substrate and spaced apart by a predetermined distance from each other;
   a plurality of data lines arranged in a second direction perpendicular to the first direction on the first substrate and spaced apart by a predetermined distance from each other; and
   a plurality of thin film transistors at crossing points of the plurality of data lines and the plurality of gate lines.

3. The liquid crystal display device according to claim 2, wherein each of the thin film transistors comprises a gate electrode, a source electrode, a drain electrode and an active layer.

4. The liquid crystal display device according to claim 1, wherein the pixel electrode and the common electrode are formed of one of ITO and IZO.

5. The liquid crystal display device according to claim 1, further comprising a color filter layer and a black matrix layer on the second substrate.

6. A liquid crystal display device comprising:
   a first substrate and a second substrates;
   a pixel electrode, a common electrode and a passivation layer on the first substrate, the pixel electrode and the common electrode formed on the passivation layer and exposing parts of the passivation layer, each of the pixel electrode, the common electrode and the parts of the passivation layer being alignment-treated;
   a overcoat layer including one of organic materials and inorganic materials on the second substrate, the overcoat layer being alignment-treated; and
   a liquid crystal layer between the first substrate and the second substrate,
   wherein each of the pixel electrode and the common electrode has a surface, which is alignment-treated by irradiating an ion beam using an ion beam irradiation apparatus,
   wherein the overcoat layer have a surface, which is alignment-treated by irradiating an ion beam using an ion beam irradiation apparatus,
   wherein the pixel electrode, the common electrode and the parts of the passivation layer have a surface, which are alignment-treated by irradiating the ion beam using the ion beam irradiation apparatus, wherein the liquid crystal layer directly contacts the first and second electrodes on the first substrate and the overcoat layer on the second substrate, wherein the ion beam has an energy of 200-4,000 eV and is irradiated at an angle of 0-90°.

7. The liquid crystal display device according to claim 6, wherein the pixel electrode and the common electrode are formed of one of ITO and IZO.

* * * * *